(12) United States Patent
Karpovsky et al.

(10) Patent No.: US 11,614,971 B2
(45) Date of Patent: Mar. 28, 2023

(54) SCORE CALCULATIONS FOR PROBABILITIES OF TYPES OF ACCESSIBILITIES TO DATA RESOURCES

(71) Applicant: Microsoft Technology Licensing, LLC, Redmond, WA (US)

(72) Inventors: Andrey Karpovsky, Kiryat Motzkin (IL); Arieh Bibliowicz, Binyamina (IL); Yoav Frandzel, Cabri (IL); Haim Bendanan, Haifa (IL); Michael Kuritzky Bakman, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 62 days.

(21) Appl. No.: 17/313,753

(22) Filed: May 6, 2021

(65) Prior Publication Data
US 2022/0357992 A1 Nov. 10, 2022

(51) Int. Cl.
*G06F 9/46* (2006.01)
*G06F 9/50* (2006.01)
*G06F 9/52* (2006.01)
*G06F 9/38* (2018.01)

(52) U.S. Cl.
CPC .......... *G06F 9/5027* (2013.01); *G06F 9/3836* (2013.01); *G06F 9/5011* (2013.01); *G06F 9/52* (2013.01)

(58) Field of Classification Search
CPC ........................................................ G06F 9/52
See application file for complete search history.

(56) References Cited

U.S. PATENT DOCUMENTS 10,282,557 B1 * 5/2019 Pore .................... H04L 63/102
2010/0269109 A1 * 10/2010 Cartales .............. G06F 9/45558
718/1

* cited by examiner

*Primary Examiner* — Gregory A Kessler
(74) *Attorney, Agent, or Firm* — Mannava & Kang, P.C.

(57) ABSTRACT

According to examples, an apparatus may include a processor and a memory on which are stored machine-readable instructions that when executed by the processor, may cause the processor to receive information regarding a property of a data resource and to calculate a score associated with the data resource based on the received information regarding the property. The score may correspond to a probability that the data resource is to have a first type of accessibility. The processor may compare the calculated score to a predefined threshold value and, based on the comparison of the calculated score to the predefined threshold value, may output an indication that accessibility to the data resource should be set to the first type of accessibility or a second type of accessibility.

20 Claims, 6 Drawing Sheets ered to access the data resource. In this regard, as discussed herein, the processor may apply machine learning techniques to train a model to determine whether a data resource is properly set to a certain accessibility level, e.g., publicly accessible or privately accessible, and may output an indication of whether the data resource is properly set based on the determination.

SCORE CALCULATIONS FOR PROBABILITIES OF TYPES OF ACCESSIBILITIES TO DATA RESOURCES

BACKGROUND

Data resources may be set to enable private accessibility or public accessibility. Computing devices may control access to the data resources based on predetermined settings for access to the data resources.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
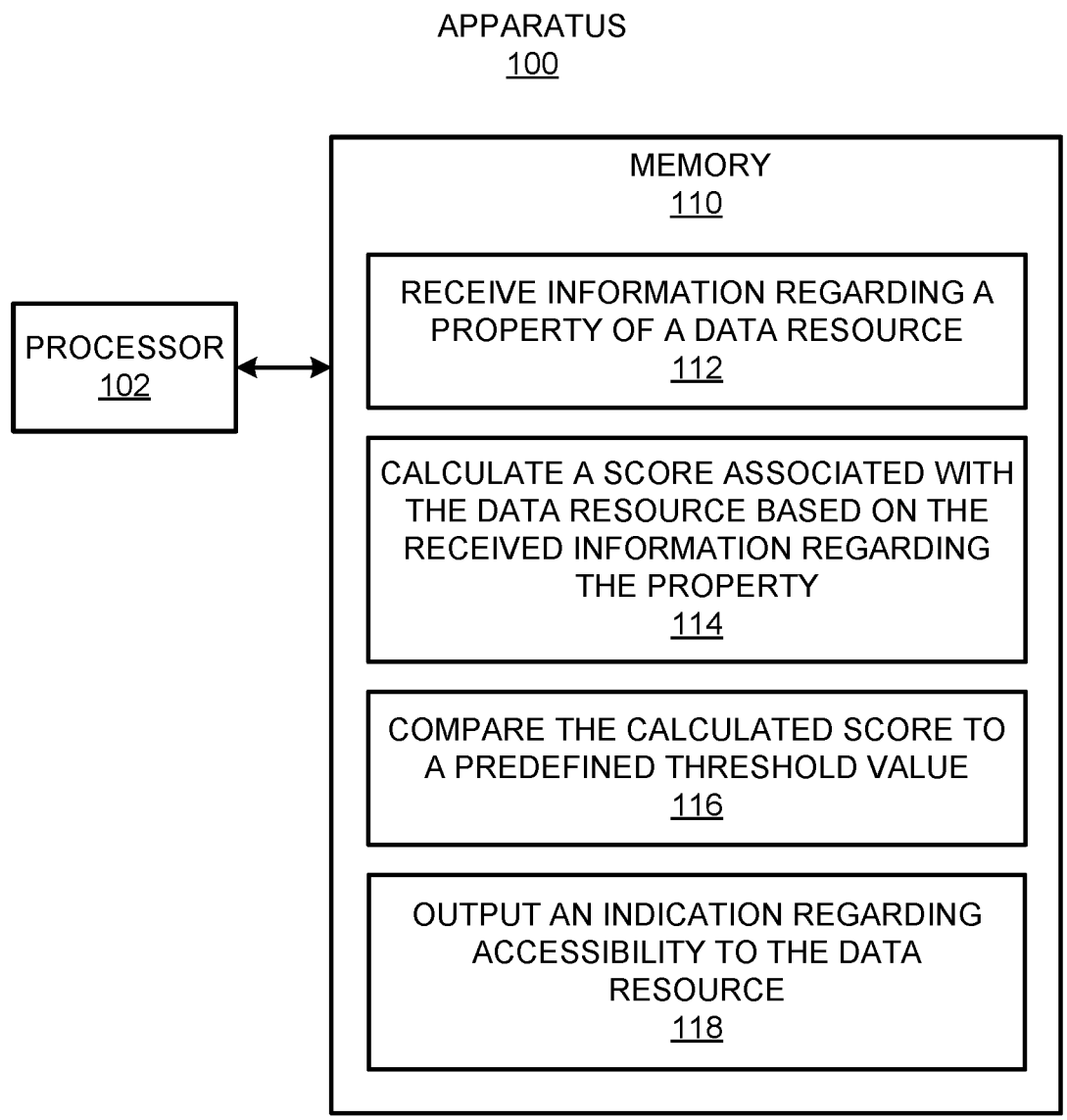
FIG. 1 depicts a block diagram of an apparatus that may receive information regarding a property of a data resource, calculate a score corresponding to a type of accessibility of the data resource based on the received information, and output an indication regarding the setting of the accessibility to the data resource, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Generally, data resources may be set to have certain types of accessibility to control access to contents of the data resources. For instance, data resources may be set to be publicly accessible or privately accessible. When a data resource is set to be publicly accessible, relatively limited or no restrictions may be in place for access to content in the data source such that a relatively large number of entities may access content stored on the data resource. For instance, the public at large may access the content stored on the data resource when the data resource is set to be publicly accessible. When a data resource is set to be privately accessible, a restriction may be in place to restrict access to the content on the data resource to certain entities. For instance, access to the content stored on the data resource may be limited to those entities having a certain set of credentials when the data resource is set to be privately accessible.

A concern associated with managing accessibility of data resources may be that the data resources may be improperly set to be publicly accessible, which may lead to unauthorized access to sensitive or private data on the data resources. Another concern may be that the data resources may be improperly set to be privately accessible, which may lead to certain entities being unable to access content to which they are entitled to access.

In some instances, attacks by malicious actors, such as through brute force attacks on a database, may result in unauthorized access to data resources. However, the more common and harmful compromise of the data resources in the cloud domain may be due to misconfiguration of authentication policies, more so than technical vulnerabilities. For instance, misconfiguration of authentication policies or accessibility settings may be detected by malicious actors using scanning techniques, which may result in unrestricted access to resources containing sensitive or private information.

A concern associated with detecting instances of misconfigured data resources may be that in most instances it may be expected and reasonable that the data resources are set to be publicly accessible. For example, in instances in which data resources are set to be publicly accessible, a large proportion of these data resources may be correctly set to be publicly available, and as such, general recommendations or alerts to change the accessibility configuration may be ineffective. For instance, generating an alert on each instance of allowed public access may create relatively large numbers of false positives, which may lead to loss of credibility of the alerts.

Disclosed herein are apparatuses, systems, methods, and computer-readable media that may improve the accuracy in detecting improperly set accessibility for a data resource by calculating a score corresponding to a probability of whether the particular data resource should be set to a particular type of accessibility. In some examples, the processor may receive information on a property of the data resource and may calculate the score associated with the data resource based on the received information regarding the property. The processor may determine an expected type of accessibility for the data resource based on the calculated score. In some examples, the processor may compare the calculated score to a predefined threshold value, and based on the comparison, may output an indication that accessibility to the data resource should be set to a first type of accessibility or a second type of accessibility. For instance, the processor may output an indication that a data resource, which may be set to be publicly accessible, should be set to be privately accessible based on a relatively lower value of the score, which may correlate to data resources that may be expected to be set to be privately accessible. In some examples, the processor may prevent of output of the indication, based on a relatively higher value of the score, which may correlate to data resources that may be expected to be set to be publicly accessible. In these examples, the processor may output an indication that may be used to confirm or to provide confidence in accessibility settings for data resources that may be set to be public.

Through implementation of the features of the present disclosure, a processor may enable improved prediction of accessibility settings for data resources, which may improve detection of improperly configured data resources and may reduce unauthorized access to those data resources. In some examples, improved prediction of accessibility settings for the data resources may reduce an amount of processing resources consumed to compare large amounts of data associated with data resources for identifying whether content stored in the data resources should or should not be publicly accessible.

Figure 2:
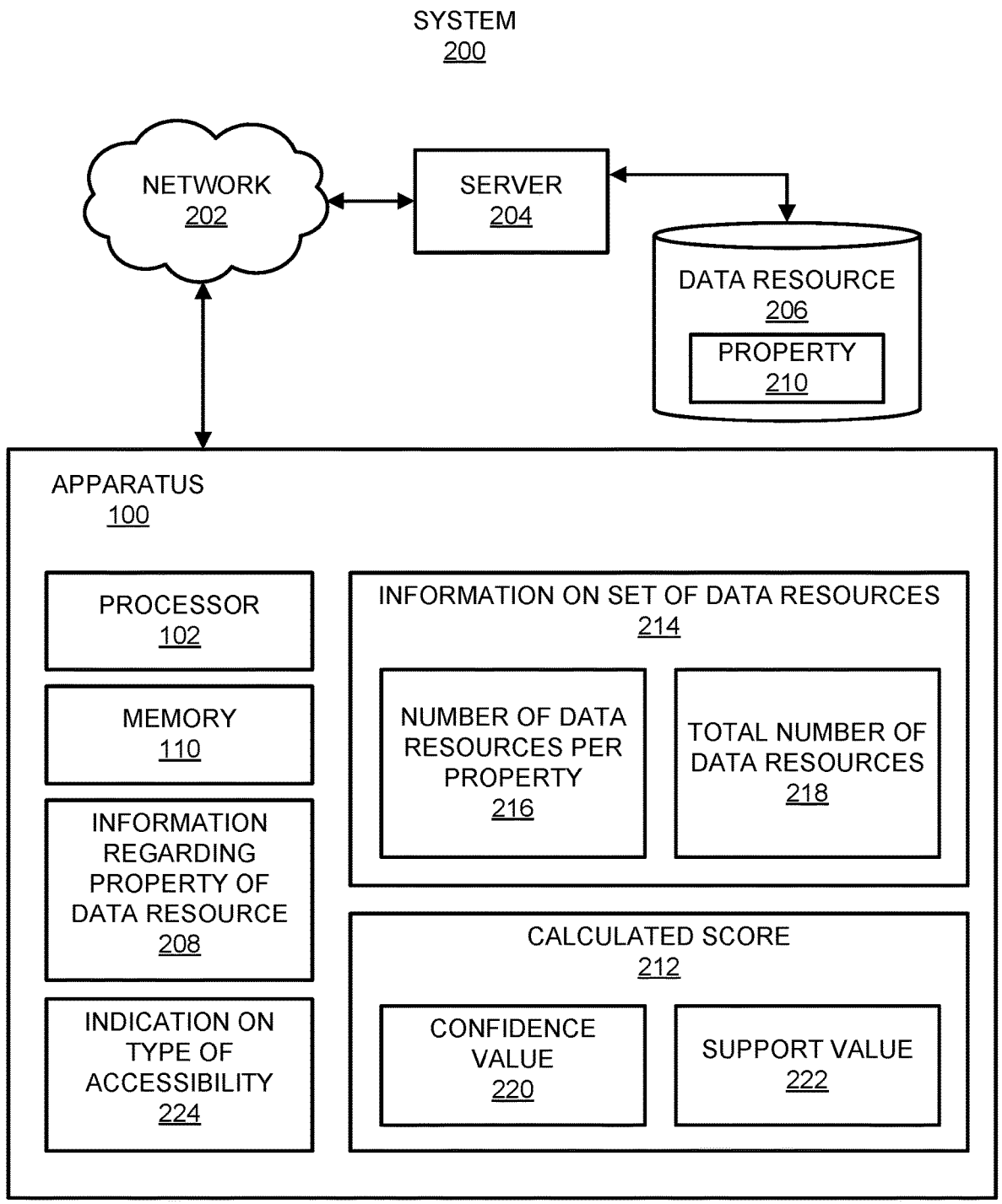
FIG. 2 depicts a block diagram of a system within which the apparatus depicted in FIG. 1 may be implemented, in accordance with an embodiment of the present disclosure.
Figure 3:
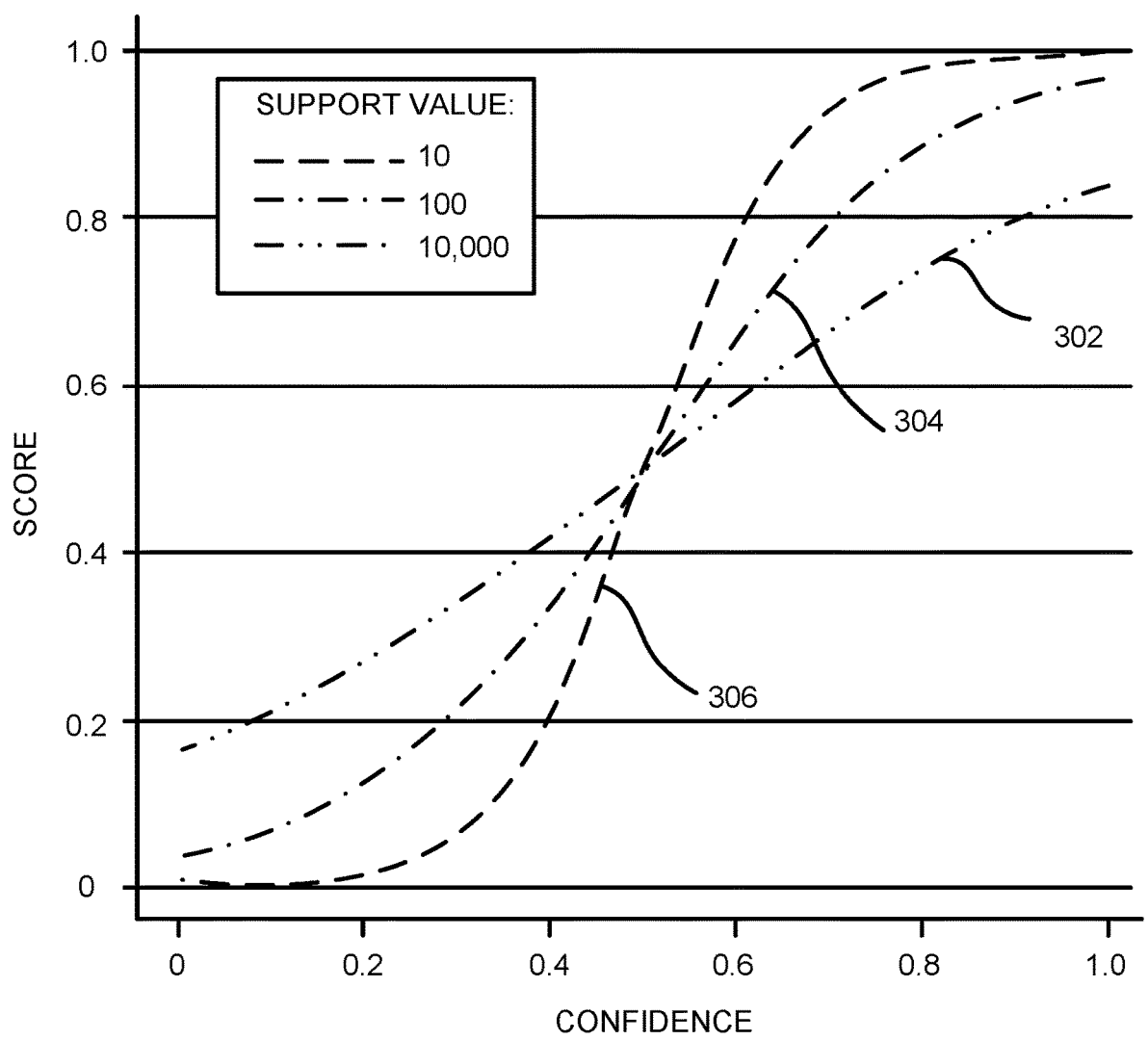
FIG. 3 depicts a graph of example scores relative to confidence values and support values, in accordance with an embodiment of the present disclosure.
Figure 4:
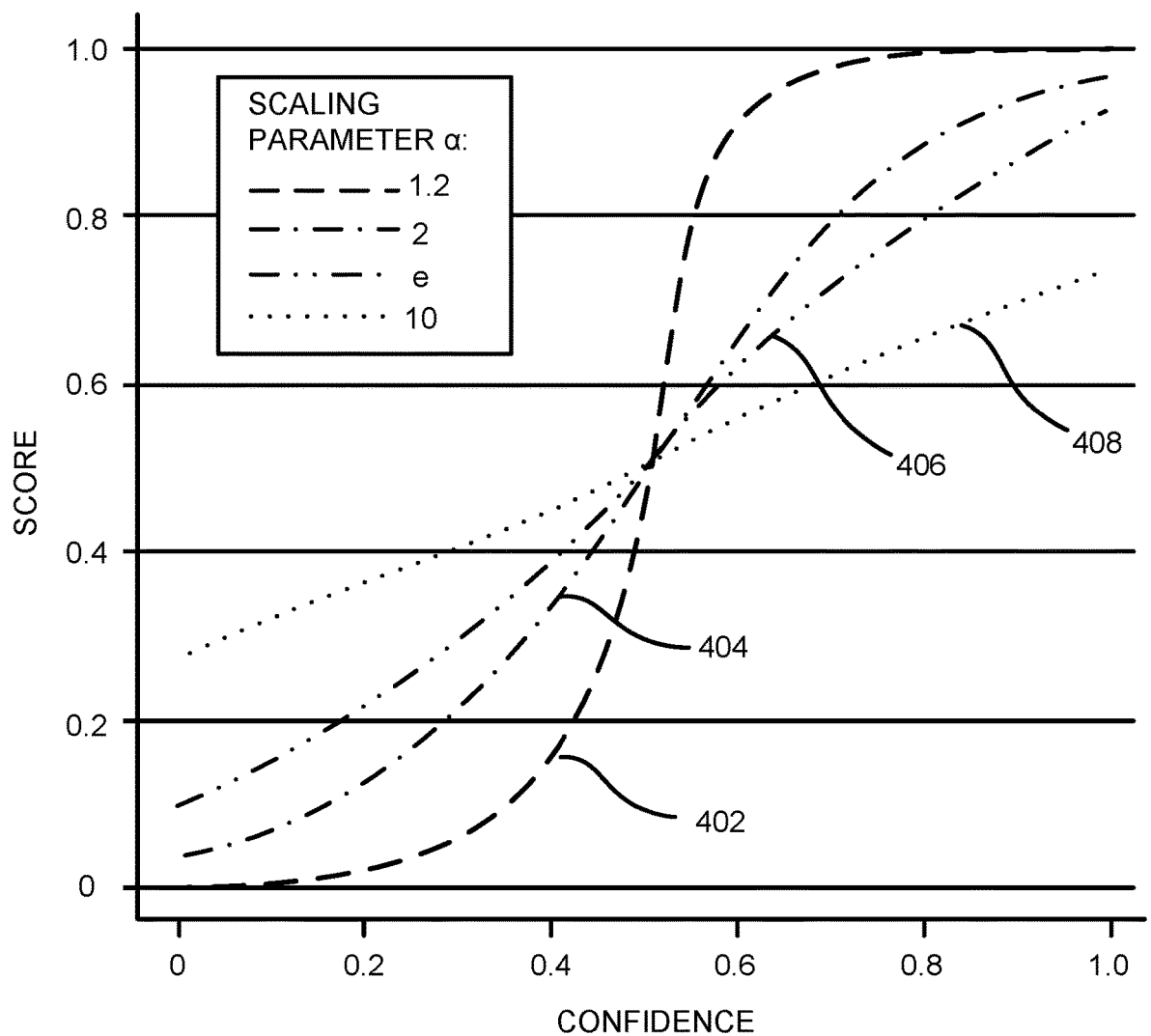
FIG. 4 depicts a graph of example scores relative to confidence values for a particular support value according to various scaling parameters, in accordance with an embodiment of the present disclosure.

Reference is made to FIGS. 1, 2, 3, and 4. FIG. 1 depicts a block diagram of an apparatus 100 that may receive information regarding a property of a data resource, calculate a score corresponding to a type of accessibility of the data resource based on the received information, and output an indication regarding the setting of the accessibility to the data resource, in accordance with an embodiment of the present disclosure. FIG. 2 depicts a block diagram of an example system 200 that may include the apparatus 100 depicted in FIG. 1, in accordance with an embodiment of the present disclosure. FIG. 3 depicts a graph of example scores relative to confidence values and support values, in accordance with an embodiment of the present disclosure. FIG. 4 depicts a graph of example scores relative to confidence values for a particular support value according to various scaling parameters, in accordance with an embodiment of the present disclosure. It should be understood that the apparatus 100 depicted in FIG. 1, the system 200 depicted in FIG. 2, and/or the example score curves 300 and 400 depicted in FIGS. 3 and 4, respectively, may include additional features and that some of the features described herein may be removed and/or modified without departing from the scopes of the apparatus 100, the system 200, and the score curves 300 and 400.

The apparatus 100 may include a processor 102 and a memory 110. The apparatus 100 may be a computing device, including a desktop computer, a laptop computer, a tablet computer, a smartphone, an electronic device such as Internet of Things (IoT) device, a server, a node in a network (such as a data center), and/or the like. The processor 102 may include a semiconductor-based microprocessor, a central processing unit (CPU), an application-specific integrated circuit (ASIC), a field-programmable gate array (FPGA), and/or other hardware device. In some examples, the apparatus 100 may include multiple processors and/or cores without departing from a scope of the apparatus. In this regard, references to a single processor as well as to a single memory may be understood to additionally or alternatively pertain to multiple processors and multiple memories.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown in FIG. 1, the processor 102 may execute instructions 112-118 to calculate a score corresponding to a type of accessibility of the data resource based on the received information and output an indication regarding accessibility to the data resource. The instructions 112-118 may be machine-readable instructions, e.g., non-transitory computer-readable instructions. In other examples, the apparatus 100 may include hardware logic blocks or a combination of instructions and hardware logic blocks to implement or execute functions corresponding to the instructions 112-118.

The apparatus 100 may be connected via a network 202, which may be the Internet, a local area network, and/or the like, to a server 204 and a data resource 206 connected to the server 204. In some examples, the data resource 206 may be stored locally on the apparatus 100, stored on multiple servers 204 connected to the network 202, and/or the like. The apparatus 100 may monitor the data resource 206 and may gather information regarding the data stored on the data resource 206. In some examples, the data resource 206 may have settings to control access to the data resource 206.

The processor 102 may fetch, decode, and execute the instructions 112 to receive information 208 regarding a property 210 of the data resource 206. In some examples, the property 210 may be an attribute, a quality, or a characteristic of the data resource 206 or the data stored on the data resource 206. By way of particular example and for purposes of illustration, the property 210 may be a name associated with the data resource 206, such as a name of an entity, a name of an account, a name of a resource group, a name of a particular container, and/or the like. In other examples, the property 210 may include traffic patterns associated with access to the data resource 206, a type of content in the data resource 206, and/or a combination thereof. For instance, the property 210 may be a naming pattern that may contain a pattern such as "*-backup-*", a traffic pattern such as previous access to the data resource by less than 5 IP rangers, a type of the content such as personal information/passwords, or a combination of such properties.

The processor 102 may fetch, decode, and execute the instructions 114 to calculate a score 212 associated with the data resource 206 based on the received information 208 regarding the property 210. The score 212 may correspond to a probability that the data resource 206 is to have a first type of accessibility. By way of particular example where the first type of accessibility is public accessibility, the score 212 may have a range between an upper end, which may correspond to a probability that the data resource 206 should be set to be publicly accessible, and a lower end, which may correspond to a probability that the data resource 206 should be set to be not publicly accessible, for instance, privately accessible.

The processor 102 may calculate the score 212 based on information 214 on a set of data resources. The set of data resources may include data resources that may have a property that matches the property 210 of the data resource 206. In some examples, the processor 102 may gather, over a period of time, data associated the set of data resources for various properties, such as naming conventions, traffic patterns, or the like, and with respect to a type of accessibility to which the set of data resources may be set. The information 214 on the set of data resources may include a number 216 of data resources having a particular type of property and being set to be publicly accessible. The information 214 may also include a total number 218 of the data resources included in the set of data resources for the particular type of property. By way of particular example, the property 210 associated with the information 214 may be a particular naming convention, such as a file name that includes the word "backup". In this example, the information 214 may include a number 216 of data resources that matches the property 210 and which are set to be publicly accessible. The information 214 may also include the total number 218 of data resources that matches the property 210, in particular those data resources having the particular naming convention in this set of data resources. In this example, if the set of data resources includes 50 different data resources that have the naming pattern "*-backups-*" and 5 of those are set to be publicly accessible, the number 216 of data resources per property may be 5 and the total number 218 may be 50.

The processor 102 may calculate the score 212 using a confidence value 220 and a support value 222, which may be determined from the information 214 on the set of data resources. The confidence value 220 may be an unweighted probability that the set of data resources are set to the first type of accessibility. Continuing with the example in which the property 210 is a naming pattern "*-backups-*" and the first type of accessibility is public accessibility, the confidence value 220 may be a ratio between instances of data resources in the set of data resources that are set to be publicly accessible out of all instances in the set of data resources. In this example, the confidence value 220 may be a ratio of 5 data resources that are publicly accessible to 50 total data resources having the naming pattern, or a value of 0.1.

A relatively high value for the confidence value 220 may correlate with a relatively high probability that data resources having the particular naming convention will be set to be publicly accessible, while a relatively low value for the confidence value 220 may correlate with a relatively low probability that the data resources having the particular naming convention will be set to be publicly accessible, for instance, set to a second type of accessibility or set to be privately accessible. The processor 102 may assign as the confidence value 220, the ratio of the determined number 216 of data resources set to have the first type of accessibility to the total number 218 of data resources in the set of data resources having the associated property.

The support value 222 may be a weighting factor to weight the confidence value 220. The processor 102 may assign, as the support value 222, the total number 218 of data resources in the set of data resources. Continuing with the example in which the property is the naming pattern "*-backups-*", the support value 222 may be the total number 218 of data resources in the set of data resources having the word "backup" in its name. In this example, the support value 222 may be assigned a value of 50. In this regard, a relatively large value for the support value 222 may be associated with more accurate data, while a relatively small value for the support value 222 may be associated with less reliable data.

By way of particular example and for purposes of illustration, the processor 102 may calculate the score 212 based on the determined confidence value 220 and the support value 222, according to an example Equation 1 as follows:

$$\text{SCORE} = \frac{1}{1 + e^{\log_\alpha n \cdot (0.5 - x)}} \qquad \text{Equation 1}$$

In Equation 1, x is the confidence value 220, n is the support value 222, and a is a scaling parameter. Referring to the graph depicted in FIG. 3, the confidence value 220 ($x$) is shown on the horizontal axis and the score 212 is shown on the vertical axis. The score 212 and the confidence value 220 may be normalized values in a range of [0,1]. While the logistic function of Equation 1 is described herein for purposes of illustration, it should be understood that the score 212 may be calculated using various types of functions other than the logistic function depicted in Equation 1.

Referring now to FIG. 3, by way of particular example and for purposes of illustration, the processor 102 may weight the effect of the support value 222 to the confidence value 220 to generate score curves 300. The value of the score 212 for a particular confidence value 220 may change based on a value of the support value 222. As depicted in FIG. 3, curves 302, 304, and 306 may be different score curves 300 according to different values for the support values 222 of 10, 100, and 10,000, respectively. The processor 102 may calculate the score 212 according to Equation 1 to preserve the confidence value, while increasing the score values for which the support value 222 is higher. For instance, if a confidence value of 0.9 is supported by a relatively large set of data resources, such as illustrated by curve 306 for support value 222 of 10,000, the score 212 may be close to 1.0. In another instance, if a confidence value of 0.9 is supported by a relatively small set of data resources, such as illustrated by curve 302 for support value 222 of 10, the score 212 may be close to 0.8. As such, the score 212 may reflect both the confidence value 220 and the support value 222 using a single value.

Referring now to FIG. 4, the processor 102 may weight the effect of the scaling parameter α on the confidence value 220. By way of particular example and for purposes of illustration, FIG. 4 depicts example score curves 400 according to different scaling parameter a values. In FIG. 4, the support value 222 may be set to n=100. The curves 402, 404, 406, and 408 may be different score curves according to different values of the scaling parameter α of 1.2, 2, e, and 10, respectively. The scaling parameter α may control a steepness of a sigmoid function, which may represent a convergence rate of the metric to extreme values for different sample sizes. In some examples, the processor 102 may increase a weight to scores 212 which may be associated with a relatively bigger set of data resources.

The processor 102 may fetch, decode, and execute the instructions 116 to compare the calculated score 212 to a predefined threshold value. In some examples, the predefined threshold value may correlate to a value of the calculated score 212 which may suggest that public accessibility for a particular data resource would be unusual. Alternatively or additionally, a predefined threshold value may correlate to a value of the calculated score 212 which may suggest that public accessibility for the particular data resource would not be unusual or outside what would be expected of that type of a data resource. The predefined threshold value may be user-defined and may be based on testing, modeling, simulations, and/or the like.

Based on the comparison of the calculated score 212 to the predefined threshold value, the processor 102 may fetch, decode, and execute the instructions 116 to output an indication 224 that accessibility to the data resource 206 should be set to the first type of accessibility or a second type of accessibility. In some examples, based on a determination that the calculated score 212 is below the predefined threshold value, while the data resource may be set to have the first type of accessibility, the processor 102 may output the indication 224 to indicate that the data resource 206 should be set to the second type of accessibility and/or change the data resource to be set to the second type of accessibility.

For instance, the predefined threshold value may correlate to a probability that public accessibility would be unusual. By way of particular example and for purposes of illustration, the predefined threshold value for the calculated score 212 may be set to be 0.05. In this example, a calculated score 212 that is below 0.05 for a set of data resources may indicate that it may be unusual for those data resources to be set to be publicly accessible. For instance, if 65% of the set of data resources have a score 212 below 0.05, this may indicate that public accessibility for data resources having the particular property 210 would be unusual. In this example, if a subset of those data resources, for instance about 5% of the set of data resources, have a calculated score 212 of 0<Score<0.05, this may indicate those data resources which may have been improperly set to be publicly accessible. The processor 102 may output the indication 224 to indicate that the data resource 206 may be incorrectly set to be publicly accessible and should be set to be privately accessible. Alternatively or additionally, the processor 102 may output instructions to automatically change the accessibility of the data resource 206, for instance, to be changed from being set to be publicly accessible to be set to be privately accessible.

In some examples, based on a determination that the calculated score 212 is above the predefined threshold value, while the data resource 206 may be set to have the first type of accessibility, the processor 102 may prevent output of the indication 224 associated with the set first type of accessibility. For instance, the predefined threshold value may correlate to a probability that public accessibility, based on the property 210, may not be usual. In these instances, the processor 102 may prevent output of indications alerting the user as to the public accessibility. In some instances, the processor 102 may output an indication, or other types of messaging, to indicate a recommended type of accessibility for the data resource 206.

Figure 5:
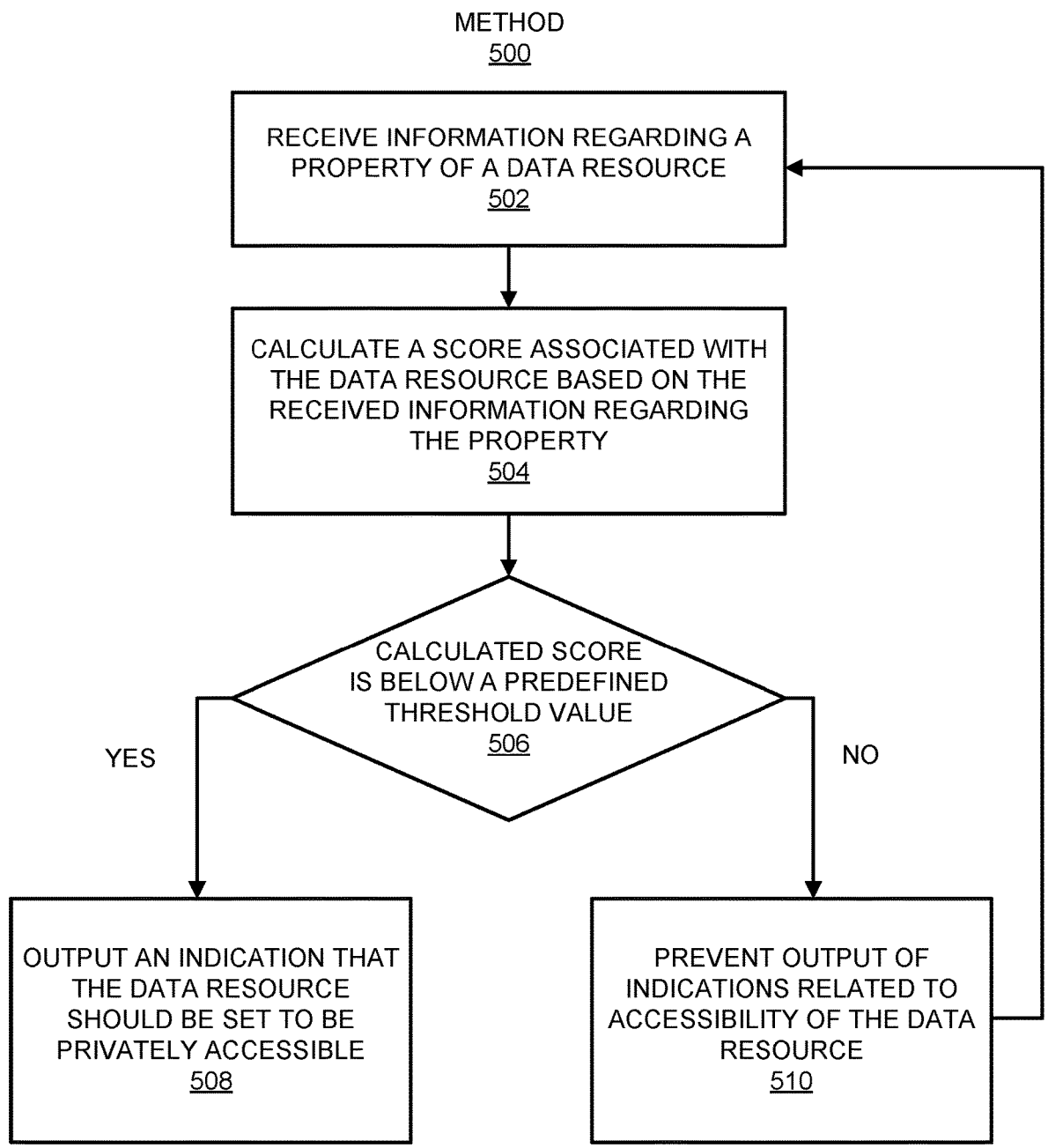
FIG. 5 shows a flow diagram of a method for calculating a score associated with a data resource based on information regarding a property of the data resource and outputting an indication that the data resource should be set to be privately accessible based on the calculated score, in accordance with an embodiment of the present disclosure.

Various manners in which a processor implemented on the apparatus 100 may operate are discussed in greater detail with respect to the method 500 depicted in FIG. 5. FIG. 5 depicts a flow diagram of a method 500 for calculating a score associated with a data resource based on information regarding a property of the data resource and outputting an indication that the data resource should be set to be privately accessible based on the calculated score, in accordance with an embodiment of the present disclosure. It should be understood that the method 500 depicted in FIG. 5 may include additional operations and that some of the operations described therein may be removed and/or modified without departing from the scope of the method 500. The description of the method 500 is made with reference to the features depicted in FIGS. 1 and 2 for purposes of illustration.

At block 502, the processor 102 may receive information regarding a property 210 of a data resource 206. The data resource 206 may be disposed on the apparatus 100 or connected to the apparatus 100 via the network 202 at the server 204, and/or the like.

At block 504, the processor 102 may calculate a score 212 associated with the data resource 206 based on the received information 214 regarding the property 210. The calculated score 212 may correspond to a probability that the data resource 206 is to be publicly accessible.

At block 506, the processor 102 may compare whether the calculated score 212 is below a predefined threshold value. The predefined threshold value may correspond to a value of the calculated score 212 at which the data resource 206 is to be set to be privately accessible.

At block 508, based on the calculated score 212 being below the predefined threshold value, the processor 102 may output an indication 224 that the data resource 206 should be set to be privately accessible.

At block 510, based on the calculated score 212 not being below the predefined threshold value, the processor 102 may prevent output of indications related to accessibility of the data resource 206. In some examples, the predefined threshold value may be a second threshold value corresponding to an upper end of the range of the calculated score 212. A value of the calculated score 212 above this second threshold value may indicate a relatively high probability that the data resource 206 having the property 210 is likely to be set to be publicly accessible. In these instances, the processor 102 may prevent output of indications or alerts for public accessibility. Alternatively or additionally, the processor 102 may output indications which may give confidence to a user that the content of the data resource 206 is likely appropriate for public access.

In some examples, the processor 102 may determine that the data resource 206 is set to be publicly accessible. In these instances, based on a determination that the calculated score 212 is below the predefined threshold value while the data resource 206 is set to be publicly accessible, the processor 102 may output the indication 224 to indicate that the data resource 206 may be improperly set to be publicly accessible. Alternatively or additionally, the processor 102 may change the data resource 206 to be set to be privately accessible. For instance, the processor 102 may output instructions to automatically change an accessibility setting of the data resource 206.

In some examples, the processor 102 may determine a confidence value 220 based on the received information 208 regarding the property 210. The confidence value 220 may be an unweighted probability that the data resource 206 should be set to be publicly accessible. The processor 102 may determine a support value 222 based on the received information 208 regarding the property 210. The support value 222 may be a weighing factor to weight the confidence value 220.

In some examples, the processor 102 may weight the confidence value 220 by the support value 222 according to a scaling parameter, such as the scaling parameter a previously described with reference to Equation 1. The processor 102 may assign the weighted confidence value 220 as the calculated score 212 associated with the data resource 206.

In some examples, the processor 102 may identify a set of data resources having a property that matches the property 210 of the data resource 206. The set of data resources may be data resources for the information 214 on the set of data resources depicted in FIG. 2. The processor 102 may determine a number 216 of data resources in the set of data resources that are set to be publicly accessible. The processor 102 may assign, as the confidence value 220, a ratio of the determined number 216 of data resources to a total number 218 of data resources in the set of data resources. The processor 102 may assign as the support value 222 the total number 218 of data resources in the set of data resources.

In some examples, the processor 102 may calculate the score 212 based on a particular type of the property 210 of the data resource 206. In some examples, the property 210 may include a name associated with the data resource, traffic patterns associated with access to the data resource, a type of content in the data resource, and/or a combination thereof.

In this regard, the set of data resources on which the information 214 is based may be a group of data resources having the same property as the property 210 of the data resource.

Some or all of the operations set forth in the method 500 may be included as utilities, programs, or subprograms, in any desired computer accessible medium. In addition, the method 500 may be embodied by computer programs, which may exist in a variety of forms both active and inactive. For example, they may exist as machine-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 6:
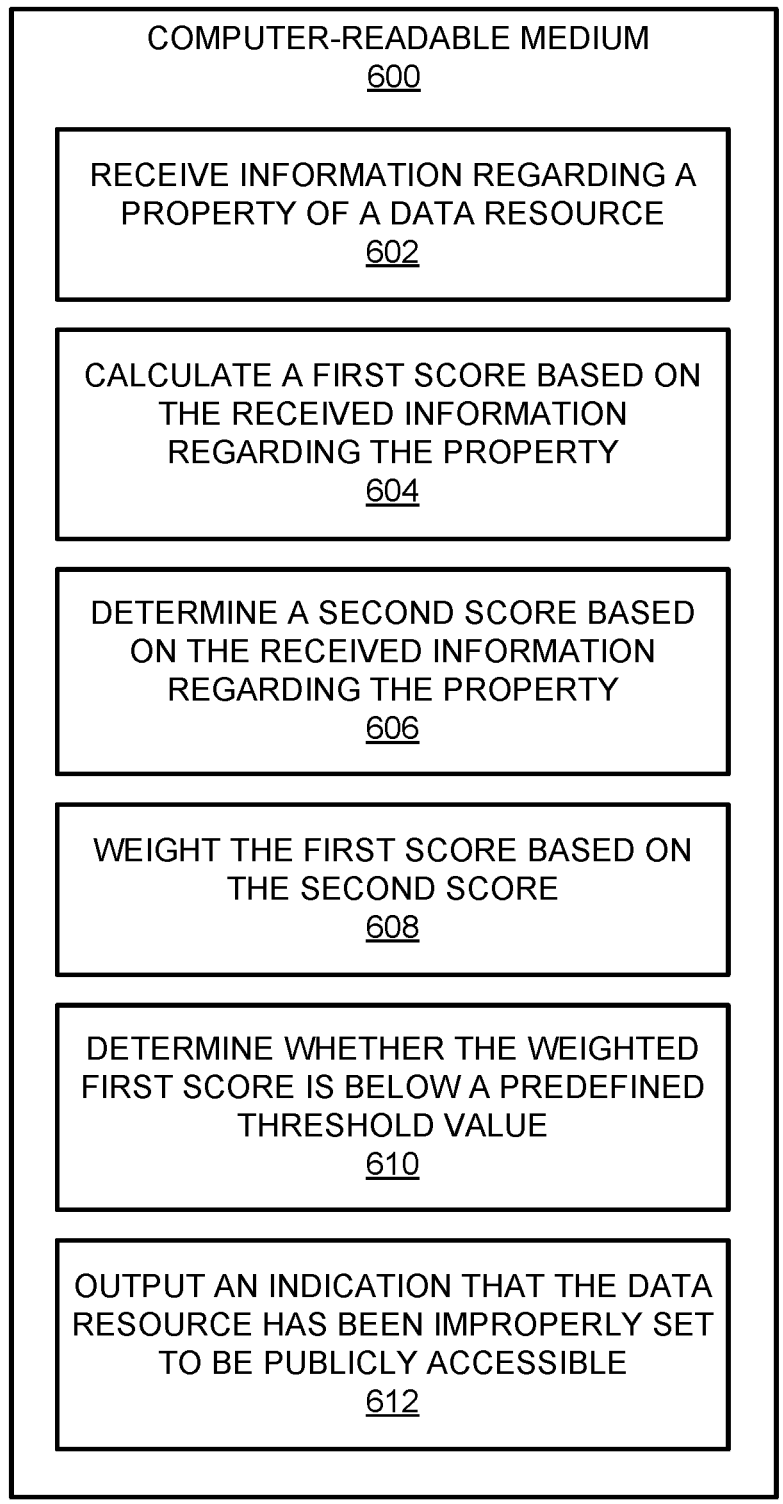
FIG. 6 depicts a block diagram of a computer-readable medium that may have stored thereon computer-readable instructions to calculate a first score based on a property of a data resource, weight the first score based on a second score associated with a number of data resources that match the property of the data resource, and output an indication that the data resource has been improperly set to be publicly accessible based on the weighted first score, in accordance with an embodiment of the present disclosure.

Turning now to FIG. 6, there is shown a block diagram of a computer-readable medium 600 that may have stored thereon computer-readable instructions to calculate a first score based on a property of a data resource, weight the first score based on a second score associated with a number of data resources that match the property of the data resource, and output an indication that the data resource has been improperly set to be publicly accessible based on the weighted first score, in accordance with an embodiment of the present disclosure. It should be understood that the computer-readable medium 600 depicted in FIG. 6 may include additional instructions and that some of the instructions described herein may be removed and/or modified without departing from the scope of the computer-readable medium 600 disclosed herein. The description of the computer-readable medium 600 is made with reference to the features depicted in FIGS. 1 and 2 for purposes of illustration. The computer-readable medium 600 may be a non-transitory computer-readable medium. The term "non-transitory" does not encompass transitory propagating signals.

The computer-readable medium 600 may have stored thereon machine-readable instructions 602-612 that a processor disposed in an apparatus 100 may execute. The computer-readable medium 600 may be an electronic, magnetic, optical, or other physical storage device that contains or stores executable instructions. The computer-readable medium 700 may be, for example, Random Access memory (RAM), an Electrically Erasable Programmable Read-Only Memory (EEPROM), a storage device, an optical disc, and the like.

The processor may fetch, decode, and execute the instructions 602 to receive information 208 regarding a property 210 of a data resource 206. The processor may fetch, decode, and execute the instructions 604 to calculate a first score, such as the confidence value 220 depicted in FIG. 2, based on the received information 208 regarding the property 210.

The processor may fetch, decode, and execute the instructions 606 to determine a second score, such as the support value 222 depicted in FIG. 2, based on the received information 208 regarding the property 210. The second score may be a number of data resources that match the property of the data resource.

The processor may fetch, decode, and execute the instructions 608 to weight the first score based on the second score. In some examples, the processor may assign a greater value to the first score, or confidence value 220, that is associated with a relatively greater second score, or support value 222, such that confidence values generated using a relatively greater number of sample data resources may be weighted more than confidence values generated using a relatively small number of sample data resources.

The processor may fetch, decode, and execute the instructions 610 to determine whether the weighted first score is below a predefined threshold value. Based on a determination that the weighted first score is below the predefined threshold value, the processor may fetch, decode, and execute the instructions 612 to output an indication that the data resource has been improperly set to be publicly accessible, such as the indication 224 depicted in FIG. 2.

The processor may determine that the data resource 206 has been improperly set to be publicly accessible based on the weighted first score being below the predefined threshold value while the data resource 206 is set to be publicly accessible. In some examples, the predefined threshold value may correlate to a probability that the data resource 206 should be set to be privately accessible.

The processor may identify a set of data resources having a property that matches the property 210 regarding the data resource 206. The processor may determine a number 216 of data resources in the set of data resources that are set to be publicly accessible. The processor may assign, as the first score, a ratio of the determined number 216 of data resources to a total number 218 of data resources in the set of data resources. The processor may assign, as the second score, the total number 218 of data resources in the set of data resources.

In some examples, the property 210 of the data resource 206 may include various types of attributes, qualities, or characteristics of the data resource 206 or the content of the data resource 206. In this regard, the property 210 may include a name associated with the data resource, traffic patterns associated with access to the data resource, a type of content in the data resource, and/or the like.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine-readable instructions that when executed by the processor, cause the processor to:
receive information regarding a property of a data resource;
determine a confidence value based on the received information regarding the property of the data resource, the confidence value being an unweighted probability that the data resource is to be set to a first type of accessibility;
calculate a score associated with the data resource based on the confidence value, the score being correlated to the unweighted probability that the data resource is to be set to the first type of accessibility;

compare the calculated score to a predefined threshold value; and based on the comparison of the calculated score to the predefined threshold value, output an indication that accessibility to the data resource is to be set to the first type of accessibility or a second type of accessibility.

2. The apparatus of claim 1, wherein the instructions further cause the processor to:

based on a determination that the calculated score is below the predefined threshold value while the data resource is set to have the first type of accessibility, output the indication to indicate that the data resource is to be set to the second type of accessibility and/or change the data resource to be set to the second type of accessibility.

3. The apparatus of claim 1, wherein the instructions further cause the processor to:

Based on a determination that the calculated score is above the predefined threshold value while the data resource is set to have the first type of accessibility, prevent output of the indication that accessibility to the data resource is to be the set to the second type of accessibility.

4. The apparatus of claim 1, wherein the instructions further cause the processor to:

determine a support value based on the received information regarding the property, the support value being a weighing factor to weight the confidence value.

5. The apparatus of claim 4, wherein the instructions cause the processor to:

weight the confidence value by the support value according to a scaling parameter; and assign the weighted confidence value as the calculated score associated with the data resource.

6. The apparatus of claim 4, wherein the instructions cause the processor to:

identify a set of data resources having a property that matches the property of the data resource;

determine a number of data resources in the set of data resources that are set to have the first type of accessibility; and assign, as the confidence value, a ratio of the determined number of data resources to a total number of data resources in the set of data resources.

7. The apparatus of claim 6, wherein the instructions cause the processor to:

assign, as the support value, the total number of data resources in the set of data resources.

8. The apparatus of claim 1, wherein the property comprises a name associated with the data resource, traffic patterns associated with access to the data resource, a type of content in the data resource, and/or a combination thereof.

9. A method comprising:

receiving, by a processor, information regarding a property of a data resource;

determining, by the processor, a confidence value based on the received information regarding the property, the confidence value being an unweighted probability that the data resource is to be set to be publicly accessible;

calculating, by the processor, a score associated with the data resource based on the confidence value;

comparing, by the processor, whether the calculated score is below a predefined threshold value, the predefined threshold value corresponding to a value at which the data resource is to be set to be privately accessible; and outputting, by the processor, an indication that the data resource is to be set to be privately accessible based on the calculated score being below the predefined threshold value.

10. The method of claim 9, further comprising:

determining that the data resource is set to be publicly accessible; and based on a determination that the calculated score is below the predefined threshold value while the data resource is set to publicly accessible, outputting the indication to indicate that the data resource is improperly set to be publicly accessible and/or change the data resource to be set to be privately accessible.

11. The method of claim 9, further comprising:

determining a support value based on the received information regarding the property, the support value being a weighing factor to weight the confidence value.

12. The method of claim 11, further comprising:

weighting the confidence value by the support value according to a scaling parameter; and assigning the weighted confidence value as the calculated score associated with the data resource.

13. The method of claim 11 further comprising:

identifying a set of data resources having a property that matches the property of the data resource;

determining a number of data resources in the set of data resources that are set to be publicly accessible; and assigning, as the confidence value, a ratio of the determined number of data resources to a total number of data resources in the set of data resources.

14. The method of claim 13, further comprising:

assigning as the support value, the total number of data resources in the set of data resources.

15. The method of claim 11, wherein the property comprises a name associated with the data resource, traffic patterns associated with access to the data resource, a type of content in the data resource, and/or a combination thereof.

16. A non-transitory computer-readable medium on which is stored computer-readable instructions that, when executed by a processor, cause the processor to:

receive information regarding a property of a data resource;

calculate a first score based on the received information regarding the property;

determine a second score based on the received information regarding the property, the second score being a number of data resources that match the property of the data resource;

weight the first score based on the second score;

determine whether the weighted first score is below a predefined threshold value; and based on a determination that the weighted first score is below the predefined threshold value, output an indication that the data resource has been improperly set to be publicly accessible.

17. The computer-readable medium of claim 16, wherein the instructions cause the processor to:

determine that the data resource has been improperly set to be publicly accessible based on the weighted first score being below the predefined threshold value while the data resource is set to be publicly accessible, the predefined threshold value correlating to a probability that the data resource is to be set to be privately accessible.

18. The computer-readable medium of claim 16, wherein the instructions cause the processor to:

identify a set of data resources having a property that matches the property regarding the data resource;

determine a number of data resources in the set of data resources that are set to be publicly accessible; and assign, as the first score, a ratio of the determined number of data resources to a total number of data resources in the set of data resources.

19. The computer-readable medium of claim 18, wherein the instructions cause the processor to:

assign, as the second score, the total number of data resources in the set of data resources.

20. The computer-readable medium of claim 16, wherein the property comprises a name associated with the data resource, traffic patterns associated with access to the data resource, a type of content in the data resource, and/or a combination thereof.

\* \* \* \* \*